June 12, 1962

D. G. MILLER 3,038,329

METHOD AND APPARATUS FOR DETECTING HIDDEN FLAWS
IN SHEET LIKE STRUCTURES

Filed Nov. 10, 1958

Inventor
Donald G. Miller
by Stevens, Davis, Miller & Mosher
his attorneys

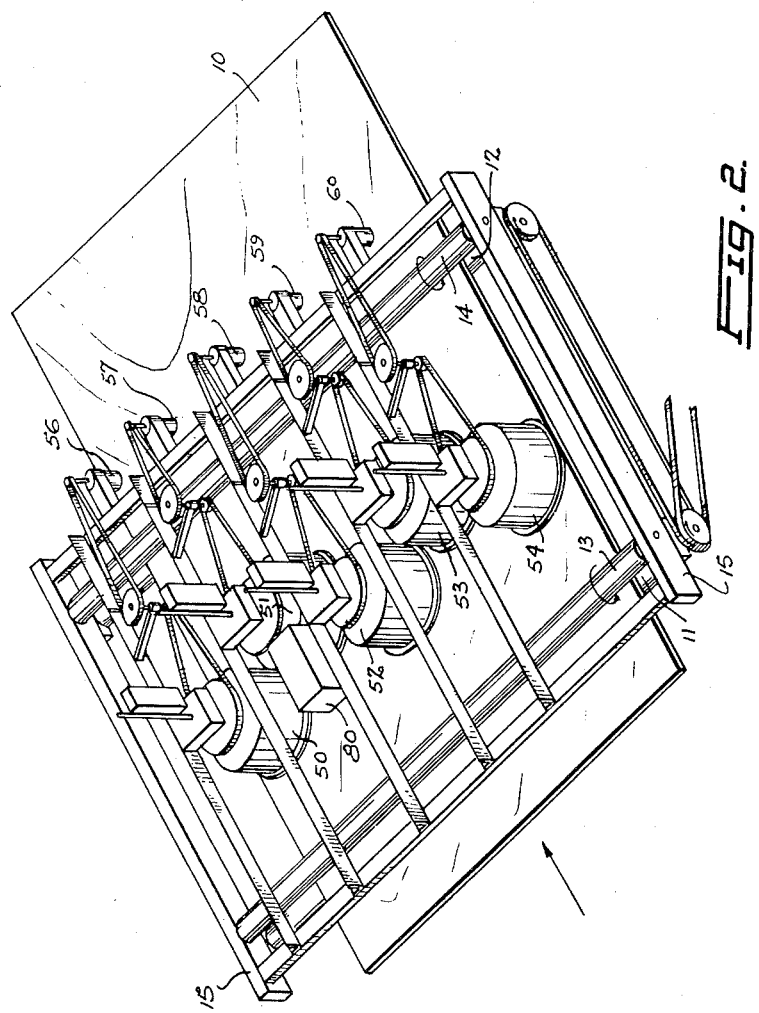

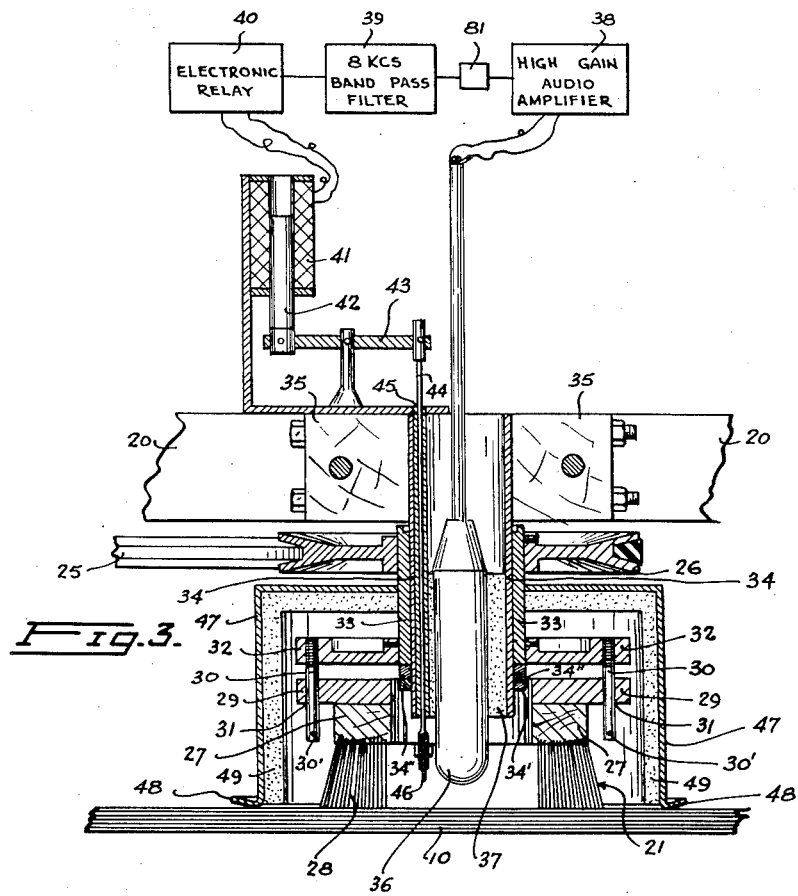

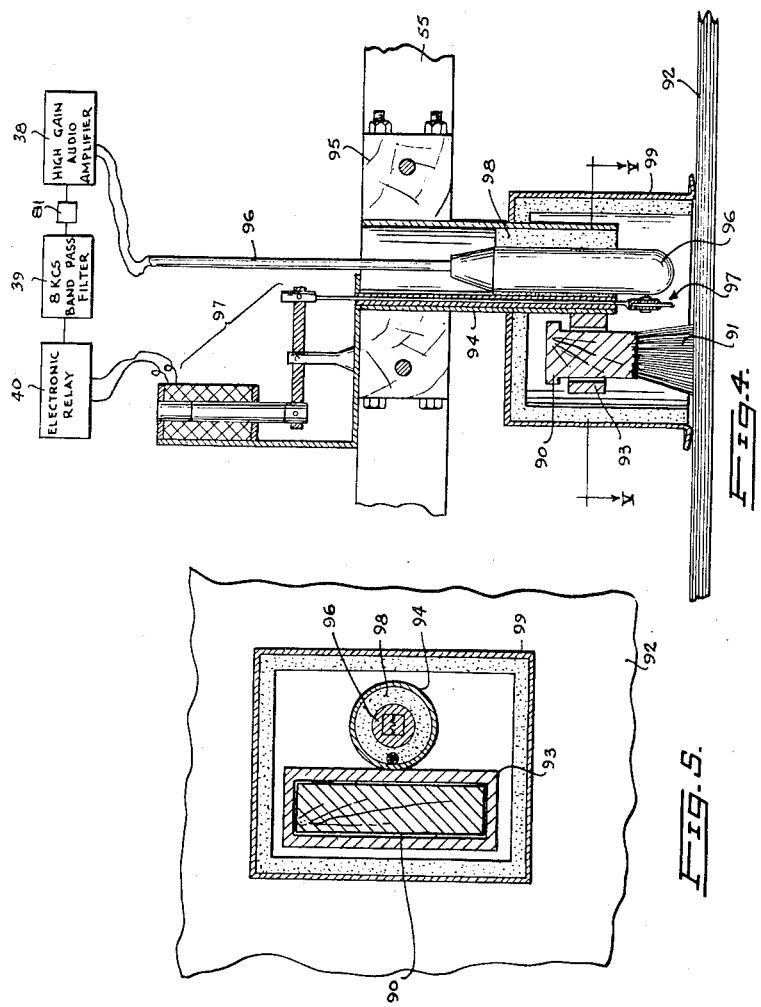

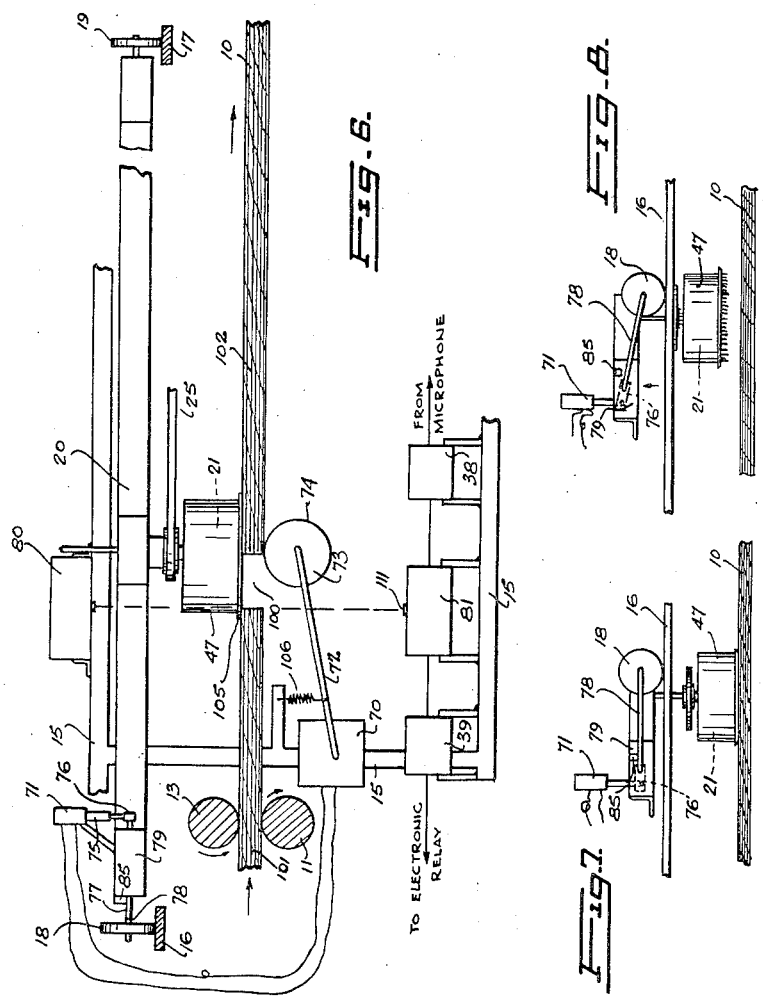

United States Patent Office 3,038,329
Patented June 12, 1962

3,038,329
METHOD AND APPARATUS FOR DETECTING HIDDEN FLAWS IN SHEET LIKE STRUCTURES
Donald G. Miller, Ottawa, Ontario, Canada, assignor to Canadian Patents and Development Limited, Ottawa, Ontario, Canada, a company
Filed Nov. 10, 1958, Ser. No. 772,821
Claims priority, application Canada Oct. 3, 1958
18 Claims. (Cl. 73—69)

This invention relates to a method of detecting blisters in laminated structures such as various grades of plywood, laminated thermoplastic and wood combinations, and honeycomb core panels. It also relates to a method for detecting separations or discontinuities caused by steam or inadequate internal bonds in other than laminated structures such as particle board. To exemplify the invention reference will be made chiefly to the detection of blisters in plywood panels, although, as will become clear, the method is of equal applicability to the detection of like defects or flaws in other sheet like structures.

The term "blister" is commonly given to the type of defect in laminated structures, such as plywood panels, which is the result of an inadequate glue bond in certain areas between plies of the sheets; such "blisters" may be large or small in area and have numerous causes. One cause to which many blisters can be attributed is an area of higher moisture content in one ply of a sheet of plywood than in either of the adjacent plies. During the bonding process which requires the use of heat, this moisture is converted to steam which prevents proper glue adhesion between the plies.

In some instances it is possible to detect blisters visually, as they appear as bulges or swelling when the plywood comes from the press, but occasionally a blister is present in the plywood and is not visually detectable. This type of blister, often called a hidden blister, is characterized in that the separation between the unbonded areas of the plies is extremely small. Variations in veneer thickness and non-uniform glue spread are two other common causes of hidden blisters.

Therefore, it frequently happens that plywood panels emerge from a manufacturing plant without the hidden blisters having been detected, and thus the defective sheets are passed on to the consumer. When these panels are put in use changes in moisture content caused by atmospheric conditions can make the plies separate in the areas of hidden blisters causing objectionable swelling to appear and necessitating repair or replacement of such panels.

Improvements in the production techniques of plywood manufacturing have done much to reduce the number of sheets of plywood with hidden blisters which reach the consumer, but nevertheless, a device for reliably detecting hidden blisters in seemingly perfect looking sheets of plywood is still much needed in the industry.

An object of this invention is to provide a method for detecting hidden blisters in laminated structures of various forms, and in particle board, more particularly in laminated structures of the plywood panel type.

A further object of this invention is to provide a device for detecting hidden blisters in plywood panels, the device being one which can be used in noisy plants by unskilled labour without having to interrupt or otherwise interfere with the production flow of the plywood panels.

Essentially the method according to the invention consists of a method of detecting hidden flaws in a sheetlike structure comprising effecting relative rubbing movement between brushing means and a substantially flat surface of said structure in a manner such as to generate sound energy, converting at least a portion of said sound energy to a corresponding electrical signal and indicating the existence of any difference between the amplitude of a preselected frequency band of said signal and a predetermined amplitude level.

The term "substantially flat surface" as used herein includes structures having simple or compound gentle curvatures, as well as structures with flat or nearly flat surfaces.

In the accompanying drawings:

FIG. 2 is a diagrammatic perspective view of a second form of the invention;

FIG. 3 is a sectional view of a brush and detector unit assembly that may be employed in each of the embodiments of FIGS. 1 and 2;

FIG. 4 is a sectional view of another form of the brush and detector unit which may be substituted for the unit of FIG. 3 in the embodiment of FIG. 2;

FIG. 5 is a cross section taken along the line V—V of FIGURE 4;

FIG. 6 is a partial side view of FIGURE 1;

FIG. 7 is a fragmentary view of FIGURE 1 as seen from the line VII—VII of FIGURE 1 with the device in its normal position; and FIG. 8 is a fragmentary view of FIGURE 1 as seen from the line VIII—VIII of FIG. 1 with the device in its raised position.

Figure 1:
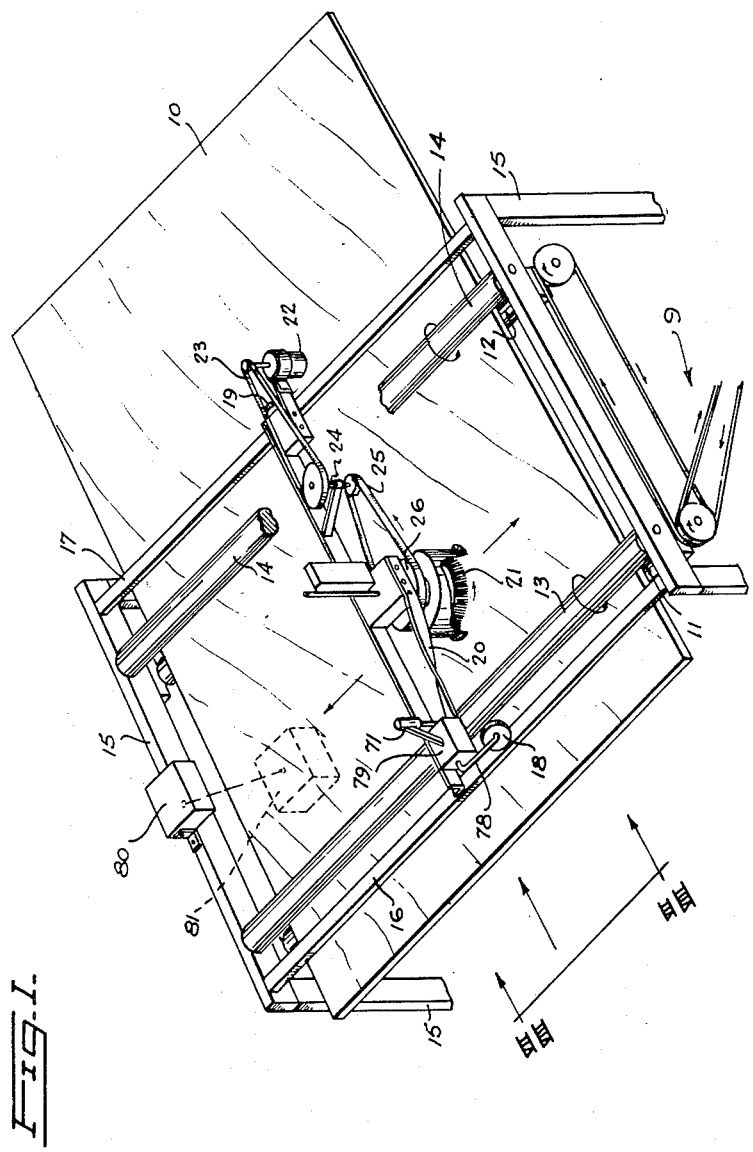
FIG. 1 is a diagrammatic perspective view of one embodiment of the invention.

In describing the embodiments of the invention, reference will be made to plywood panels and more particularly to fir plywood panels, but it is to be understood that other laminated sheet structures could be checked for hidden blisters using the same device.

With reference to FIG. 1, numeral 10 denotes a sheet of plywood, standard 4' x 8' size, held between two pairs of rollers, the lower rollers 11 and 12 being power driven by means of a motor (not shown) through the intermediary of belts and pulleys generally designated by reference numeral 9, and the upper rollers 13 and 14 idling. The rollers are held in position by a frame 15. Positioned parallel to the rollers 11, 12, 13 and 14, and attached to an upper part of the frame 15, are a pair of rails 16 and 17, upon which ride two wheels 18 and 19, each attached to a respective one of the two ends of a carriage frame 20. Also attached to the carriage frame 20 are brushing means which in this embodiment comprises a brush 21 of the type commonly used on domestic floor polishers. This brust is rotated about a vertical axis at approximately 150 r.p.m. by means of an electric motor 22 mounted on the carriage frame 20 and working through a primary drive belt 23, a reduction drive generally denoted by 24 a secondary drive belt 25 and a final drive pulley 26 connected to the brush 21.

In the operation of the device the electric motor 22 (FIG. 1) rotates the brush 21; a second electric motor (not shown)) drives the rollers 11 and 12 as previously described; and a third electric motor (also not shown) moves the carriage 20 back and forth from one extremity to the other of the rails 16 and 17 in a scanning motion thus providing means for effecting travel of the brush 21 relative to the surface of the plywood panel 10. The rollers 11 and 12 are driven at a speed sufficient to cause the panel 10 to pass through the device at a speed of 6 feet per minute. This is a practical speed of feed when only a single brush and detecting unit is used. The motor used for moving the carriage back and forth is capable of rapid and frequent reversing, and a type found suitable was a small three phase electric motor. The mechanism for actuating the carriage is not shown in detail but will comprise a scanning system of well known form. Limit switches at both ends of one of the rails 16 or 17 cause the

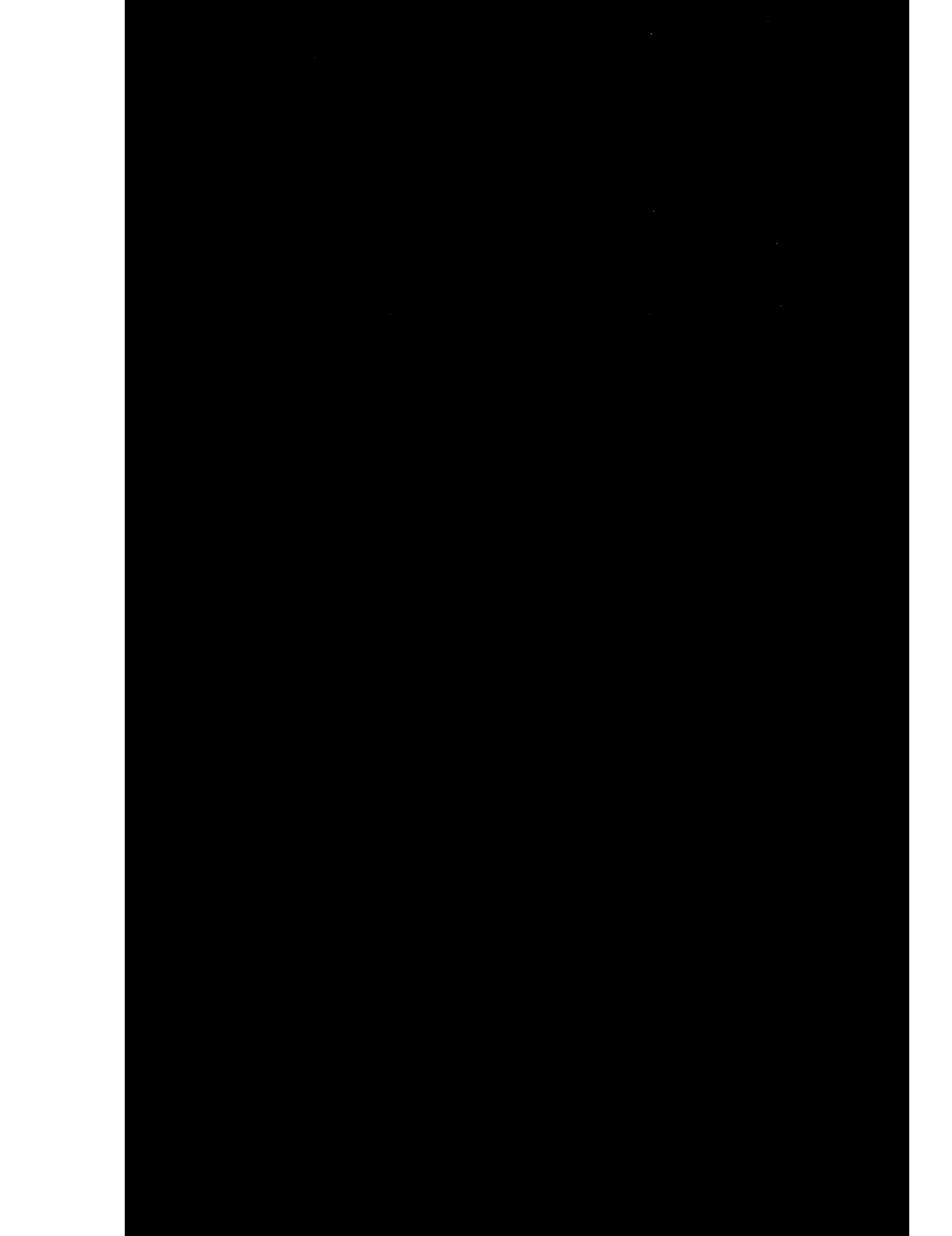

The solenoid 71 has a plunger 75 which is connected through the intermediary of an arm 76 to one end of a shaft 77 having a crank arm 78, the shaft 77 being free to rotate in a bearing block 79. To the end of the arm 78 is attached the wheel 18 which supports one end of the carriage frame 20 on the rail 16. Therefore, when current flows through the solenoid winding, the plunger 75 is caused to move, thus effecting a turning motion to the shaft 77 which rotates the crank arm 78 causing one end of the carriage frame 20 to be forced upwardly (see FIG. 8). The height to which the end of the carriage 20 is raised is sufficient to lift the brush and detector unit and cover 47 from the path of the oncoming panel, having regard to the fact that the cover 47 and the brush 21 can fall freely for a short distance when the unit is elevated.

As soon as an oncoming panel moves into position under the brush and detector unit assembly and cover 47, the switch 70 is turned to its "Off" position allowing the carriage frame 20 to move back to its normal position whereat the brush and detector unit assembly and cover are resting on the next panel. The downward limit of travel of the carriage 20 is determined by a stop 85 against which the crank arm 78 normally rests, so that the carriage 20 always, after being raised at one end, returns to a predetermined position.

Returning now to the operation of the brush assembly, as the rotating brush scans the slowly moving sheet of plywood, the gravitational force exerted on the brush causes the bristles of the brush to exert a substantially constant pressure on the top surface of the plywood panel being checked for blisters or other flaws. As the bristles of the brush sweep over the surface of the plywood panel, the mechanical impedance to motion presented to the bristles by the surface of the sheet as a result of the small irregularities therein, causes generation of a sound, the acoustic characteristics of which are determined, in part, by the acoustic impedance of the portion of the sheet beneath the bristles. Presence of a flaw in a section of the panel between two of the plies of the panel effectively changes the acoustic impedance of that section of the panel, as compared with a substantially flawless section of the panel. This effect is especially marked if the flaw is comparatively near the surface with which the brush is in contact. For example, in a laminated sheet of 7 plies, a substantial change to the acoustic impedance results from a blister between the first and second plies, or between the second and third plies, and although the effect is less when there is a blister between the third and fourth plies, there is still a detectable change in acoustic impedance. There is, in fact, some change to the acoustic impedance when blisters occur lower still in the structure, e.g. between the fourth and fifth plies, but the value of such change is usually too small to permit of ready acoustical determination, having regard to the ambient noise level at which it is desired to operate the apparatus in practice. Since blisters between the lower plies can normally be more simply detected by similarly brushing the undersurface or by inverting the panel and carrying out a similar brushing operation on the other surface, there is no need to attempt the high discrimination that would be necessary to detect blisters between the lower plies. For this reason each brush is normally only employed at any one time to detect defects between the surface in contact with the brush and approximately half way through the thickness of the panel.

The local change of acoustic impedance resulting from a blister or similar flaw is detected by the change in amplitude that it gives rise to in the sounds generated by the rotating brush. The brush generates a spectrum of frequencies in the audio range, and it has been found that a number of these frequencies are produced at greater amplitude when the brush is passing over a blister between a pair of plies in the upper half of the panel than when it is passing over a flawless section of the panel.

With the experimental apparatus employed, an increase of amplitude was observed for all frequencies between about 1.5 kcs. and about 12 kcs. An optimum increase of approximately 8 decibels was observed at 8 kcs. as a result of a blister between the third and fourth plies, and accordingly this frequency was selected for the filter 39. These observations were carried out using a conventional domestic floor polishing brush rotating at approximately 150 r.p.m. against the surface of ¾″ Douglas fir sanded sheet of plywood (7 plies). For other materials, other surface finishes and other conditions generally, the frequency may be otherwise selected to obtain optimum amplitude sensitivity to variations of acoustic impedance. As the noise in a plywood plant is mainly comprised of sound of relatively low frequencies, when selecting the frequency at which the filter is to operate it is usually better to use as high a value as can possibly be employed, commensurate with acceptable sensitivity, so that the ambient noise level of the plant does not appreciably affect the operation of the device.

The electronic relay 40 will be preset so as to remain unactuated by any signal of value below a predetermined amplitude level in the selected frequency band, but to be actuated to operate the marking device when such signal exceeds the predetermined level.

Over some parts of the frequency spectrum, a diminution of amplitude may be observed in the vicinity of a flaw-containing section of the sample under test; this effect is likely to be observed at the lower frequencies. Thus, although it is preferred to operate with audio-frequencies which experience an increase in amplitude in the vicinity of a flaw, because, generally speaking, greater and more readily detectable amplitude changes occur in those frequencies that experience an increase rather than a decrease of amplitude, the invention in its broad scope does not exclude detection of an amplitude reduction when such reduction is indicative of a hidden blister or other flaw. Under these conditions the electronic relay will be modified to be sensitive to a drop in amplitude below a predetermined level.

In many plywood production plants the rate of flow of plywood panels from the production line is approximately 25 to 30 feet per minute. As the embodiment of the invention outlined above is only capable of accepting panels at a slower rate (e.g. 6 feet per minute) another embodiment of the invention as depicted in FIG. 2 has been devised and this second embodiment will accept and check panels at the rate of 25 to 30 feet a minute.

As can be seen from FIG. 2 there are 5 stationary brush and detecting units 50, 51, 52, 53 and 54 with each unit substantially as described with reference to the unit shown in FIGS. 1 and 3, except that these units do not move from side to side and therefore are permanently secured to a frame 55 which also supports the rollers 11, 12, 13 and 14. The scanning of the surface is produced by the forward feed of the sheet. In this embodiment, each of the brushes is driven by a separate motor 56, 57, 58, 59 and 60. This is not essential, as it would be possible by using a system of belts and pulleys to drive all the brushes from one motor, thus achieving some saving in the initial cost of the device.

With regard to the electronic apparatus used in conjunction with the microphone and the marking solenoid used in each of the five brush and detecting units, it is necessary to have five separate electronic systems, each system comprising an amplifier, a filter of some predetermined frequency, and an electronic relay, just as shown in FIG. 3. Thus each brush and detecting assembly would act as a completely separate unit.

Instead of using the rotatable brush and detector unit assembly, in the embodiment of the device as shown in FIGURE 2, a brush and detector unit assembly such as the one shown in FIGURES 4 and 5 could be employed. Such a unit is much simpler in construction as compared with the rotatable brush and detector unit of FIGURE 3, and essentially comprises a brush 90 of rectangular cross-section having bristles 91 in contact with a sheet of plywood 92. The brush 90 is free to move, in a direction substantially normal to the sheet 92, in a guide block 93 which is connected to a hollow shaft 94 which is in turn connected to a block 95 bolted to the frame 55. Within the shaft 94 is suspended, in resilient material 98, a microphone 96 and a part of the marking means as generally denoted by reference numeral 97. The type of microphone used, the construction of the marking device and the manner in which such two components are electrically connected is the same as has been previously described and will not be further elaborated upon. A cover 99 similar to that previously described encloses the brush 90 and microphone 96.

In use, this brush and detecting unit depends upon the speed of movement of the panel under it to develop the required sound energy as well as to produce the scanning action. Thus a high speed of panel feed is necessary in order to achieve the desired completeness of flaw detection. Normally, one would use the device embodying staggered lines of stationary brushes in the plywood sheet assembly line which normally has the desired rate of flow and any panels marked as containing flaws could be subjected to more accurate inspection by passing them slowly through the embodiment of FIGURE 1.

When using the embodiment with a line of brush means with either revolving or stationary brushes, it is again necessary to prevent ambient noise from reaching the detectors and so a light source and photo-electric controlled switching mechanism similar to those previously described are again normally needed, but they must operate in sections. That is, a light source and a switching mechanism is needed for the leading line of brushing and detecting unit assemblies (50, 52 and 54 FIG. 2) and another light source and switching mechanism is needed for the trailing line of brush and detector unit assemblies 51 and 53. Each switching mechanism would be interconnected with the proper electrical apparatus, that is the first mechanism would control the electrical apparatus connected to the leading line of detecting units and the second mechanism would control the electrical apparatus connected to the second line of units. In this way the leading line of detecting units would be non-operative while a gap passed beneath them and would become operative again when the gap had passed from beneath them even though the gap was still passing beneath the trailing line of brush and detector units.

If the design of the apparatus requires, means generally as described with reference to the embodiment of FIG. 1 can be provided whereby when a large gap passed below the units, such units can be lifted out of the path of the oncoming panels. The main difference in the mechansim would be that the leading units (50, 52 and 54 FIG. 2) would be connected to a frame which would be movable independently of a movable frame to which the trailing units (51 and 53) would be connected. Thus the leading units would be lifted out of the path of the panels independently of the trailing units and vice-versa.

As a further embodiment the brush and detecting unit shown in FIG. 3 could be formed as a portable unit with the motor and drive mechanism forming an integral part of the unit. Such a portable unit would be extremely valuable for checking such laminated structures as plywood boat hulls.

Although in the above description of various embodiments of the invention reference has been made to a particular type of flaw in a certain laminated structure, namely hidden blisters in fir plywood, it will be appreciated that both the method and apparatus as described are capable of detecting any sort of hidden flaw in a sheet-like structure, when such flaw causes a detectable change in the acoustical impedance of the section of such structure where the flaw is located. Other types of structures which may be checked for flaws include particle boards and honey-comb core panels. Hidden knot holes can be detected in various types of plywood, and the sensitivity of the device can be adjusted so that only those knot holes of a size greater than allowable are detected. In Canada, the specifications which relate to the acceptable defects in fir plywood state that knot holes are allowable if their largest diameter is not more than one inch. Therefore, when the device is employed to detect flaws in fir plywood being manufactured in Canada, its sensitivity is preferably adjusted so that only knot holes, and other flaws of a size greater than allowable are detected. In so adjusting the sensitivity of the device, other flaws of less than the chosen allowable size will similarly escape detection, but this is acceptable since a very small blister is no more detrimental to the quality of the product than a small knot hole. If the device was to be used under conditions requiring different standards, its sensitivity could be easily adjusted to detect only those flaws which are unacceptable.

I claim:

1. A method of detecting hidden flaws in a sheet-like structure comprising effecting relative rubbing moment between brushing means and a substantially flat surface of said structure, said surface having sufficient surface irregularities that said relative rubbing is such as to generate sound energy in said surface, converting at least a portion of said sound energy to a corresponding electrical signal, sensing the existence of any difference between the amplitude of a preselected frequency band of said signal and a predetermined amplitude level, and causing said brushing means to scan substantially the entire extent of said surface whereby to detect any hidden flaws in said structure.

2. A method of detecting hidden flaws in a sheet-like structure comprising contacting a substantially flat surface of said structure with rotating brushing means in a manner such as to generate sound energy in said surface by virtue of surface irregularities on said surface, converting at least a portion of said sound energy to a corresponding electrical signal, sensing the existence of any difference between the amplitude of a preselected frequency band of said signal and a predetermined amplitude level, and causing said brushing means to scan substantially the entire extent of said surface whereby to detect any hidden flaws in said structure.

3. A method of detecting hidden flaws in a sheet-like structure comprising effecting relative rubbing movement between brushing means and a substantially flat surface of said structure, said surface having sufficient surface irregularities that said relative rubbing is such as to generate sound energy in said surface, converting at least a portion of said sound energy to a corresponding electrical signal, determining the amplitude of a preselected frequency band of said signal, causing said brushing means to scan substantially the entire extent of said surface with said brushing means remaining in such sound generating relationship to said surface, and detecting a difference between a first amplitude of said band obtained with said brushing means in a sound generating relationship with a first area of said surface disposed outwardly of a substantially flawless section of said structure and a second amplitude of said band obtained with said brushing means in sound generating relationship with a second area of said surface disposed outwardly of a flaw-containing section of said structure.

4. A method of detecting hidden flaws in a sheet-like structure comprising contacting a substantially flat surface of said structure with rotating brushing means in a manner such as to generate sound energy in said surface by virtue of surface irregularities on said surface, converting at least a portion of said sound energy to an electrical signal corresponding thereto, determining the amplitude of a preselected frequency band of said signal, causing said brushing means to scan substantially the entire extent of said surface with said brushing means remaining in such sound generating relationship to said surface, and detecting a difference between a first amplitude of said band obtained with said brushing means in sound generating relationship with a first area of said surface disposed outwardly of a substantially flawless section of said structure and a second amplitude of said band obtained with said brushing means in sound generating relationship with a second area of said surface disposed outwardly of a flaw containing section of said structure.

5. A method according to claim 3 which further comprises utilizing said difference to actuate a device for marking said second area.

6. Apparatus for detecting hidden flaws in a sheet-like structure comprising rotatable brushing means, means for rotating said brushing means to effect relative rubbing movement between said brushing means and a substantially flat surface of said structure in a manner such as to generate sound energy in said surface by virtue of surface irregularities on said surface, means separate from said relative rubbing means for detecting said sound energy, means connected to said detecting means for converting at least a portion of said detected sound energy to a corresponding electrical signal, means connected to said converting means for selecting a predetermined frequency band of said electrical signal, and means connected to said selecting means for sensing any difference between the amplitude level of said signal at said selected frequency band and a predetermined amplitude level.

7. Apparatus for detecting hidden flaws in a sheet-like structure comprising brushing means, means for effecting relative rubbing movement between said brushing means and a substantially flat surface of said structure, said surface having sufficient surface irregularities that said relative rubbing is such as to generate sound energy in said surface, means separate from said relative rubbing means for detecting said sound energy, means connected to said detecting means for converting at least a portion of said detected sound energy to a corresponding electrical signal, means connected to said converting means for determining the amplitude of a preselected frequency band of said signal, means for effecting travel of said brushing means relative to said surface with said brushing means remaining in such sound generating relationship to said surface, and means connected to said determining means for sensing a difference between a first amplitude of said band obtained with said brushing means in sound generating relationship with a first area of said surface disposed outwardly of a substantially flawless section of said structure and a second amplitude of said band obtained with said brushing means in sound generating relationship with a second area of said surface disposed outwardly of a flaw-containing section of said structure.

8. Apparatus for detecting hidden flaws in a sheet-like structure comprising rotatable brushing means, means for rotating said brushing means to effect relative rubbing movement between said brushing means and a substantially flat surface of said structure in a manner such as to generate sound energy in said surface by virtue of surface irregularities on said surface, means separate from said relative rubbing means for detecting said sound energy, means connected to said detecting means for converting at least a portion of said detected sound energy to a corresponding electrical signal, means connected to said converting means for determining the amplitude of a preselected frequency band of said signal, means for effecting travel of said brushing means relative to said surface with said brushing means remaining in such sound generating relationship to said surface, and means connected to said determining means for sensing a difference between a first amplitude of said band obtained with said brushing means in such sound generating relationship with a first area of said surface disposed outwardly of a substantially flawless section of said structure and a second amplitude of said band obtained with said brushing means in sound generating relationship with a second area of said surface disposed outwardly of a flaw-containing section of said structure.

9. Apparatus according to claim 7 which further comprises marking means responsive to said difference between said first amplitude of said band and said second amplitude of said band; said means being adapted to mark said second area in response to said difference.

10. In combination, a sheet-like structure and apparatus for detecting hidden flaws in said structure, said apparatus comprising an annular brush, means mounting said brush with its axis substantially normal to a surface of said structure, said brush having bristles extending into contact with said surface, means for rotating said brush about said axis to cause said bristles to generate sound energy at said surface by virtue of surface irregularities on said surface, means positioned adjacent said surface for detecting said sound energy, means separate from said brush for converting at least a portion of said sound energy to a corresponding electrical signal, means connected to said converting means for selecting a predetermined frequency band of said electrical signal, and means connected to said selecting means for sensing any difference between the amplitude level of said band and a predetermined amplitude level.

11. Apparatus according to claim 10 which further comprises a housing embracing said brush and detecting means, said housing forming together with said structure a complete enclosure for said brush and detecting means.

12. Apparatus according to claim 11 which further comprises marking means responsive to such sensing means and positioned adjacent such detecting means for marking said surface upon sensing by said sensing means of a said difference.

13. In an apparatus for detecting hidden flaws in a sheet-like structure the combination of said structure and an annular rotatable brush having axially projecting bristles in sound generating relationship with a surface of said structure, said surface having sufficient surface irregularities for movement of said brush relative thereto to generate sound energy in said surface, means for rotating said brush about an axis substantially normal to said surface and means for detecting said sound energy, said detecting means being separate from said brush and being positioned in non-contacting adjacent relationship to said brush and said surface.

14. Apparatus according to claim 13 which further comprises a housing embracing said brush and detecting means, said housing forming together with said structure a complete enclosure for said brush and detecting means.

15. Apparatus according to claim 14 which further comprises structure marking means positioned adjacent said detecting means.

16. Apparatus for detecting hidden flaws in a sheet-like structure comprising brushing means, means for effecting relative rubbing movement between said brushing means and a substantially flat surface of said structure, said surface having sufficient surface irregularities that said relative rubbing is such as to generate sound energy in said surface, means separate from said relative rubbing means for detecting said sound energy, means connected to said detecting means for converting at least a portion of said detected sound energy to a corresponding electrical signal, means connected to said converting means for determining the amplitude of a preselected frequency band of said electrical signal, and means connected to said selecting means for sensing a difference between a first amplitude of said band obtained with said brushing means in sound generating relationship with a first area of said surface disposed outwardly of a substantially flawless section of said structure and a second amplitude of said band obtained with said brushing means in sound generating relationship with a second area of said surface disposed outwardly of a flaw-containing section of said structure.

17. Apparatus for detecting hidden flaws in a sheet-like structure comprising brushing means, means for effecting relative rubbing movement between said brushing means and a substantially flat surface of said structure, said surface having sufficient surface irregularities that said relative rubbing is such as to generate sound energy in said surface, said means for effecting relative rubbing movement between the brushing means and said surface being further effective to cause said brushing means to scan said surface while said brushing means remain in said sound generating relationship to said surface, means separate from said relative rubbing means for detecting said sound energy, means connected to said detecting means for converting at least a portion of said detected sound energy to a corresponding electrical signal, means connected to said converting means for determining the amplitude of a preselected frequency band of said signal, and means connected to said determining means for sensing a difference between a first amplitude of said band obtained with said brushing means in sound generating relationship with a first area of said surface disposed outwardly of a substantially flawless section of said structure and a second amplitude of said band obtained with said brushing means in sound generating relationship with a second area of said surface disposed outwardly of a flaw-containing section of said structure.

18. Apparatus according to claim 17, wherein said means for causing relative movement between said brushing means and said surface are effective to cause said brushing means to scan substantially the entire extent of said surface.

References Cited in the file of this patent

UNITED STATES PATENTS

| | | |
|---|---|---|
| 2,445,731 | Jaycox | July 20, 1948 |
| 2,538,444 | Demars | Jan. 16, 1951 |
| 2,604,181 | Basham et al. | July 22, 1952 |
| 2,752,781 | Thorsen | July 3, 1956 |
| 2,782,632 | Klein et al. | Feb. 26, 1957 |
| 2,834,206 | Mindheim et al. | May 13, 1958 |
| 2,846,874 | Horn | Aug. 12, 1958 |
| 2,922,303 | Veneklasen et al. | Jan. 26, 1960 |